United States Patent [19]
de Place

[11] Patent Number: 5,151,710
[45] Date of Patent: Sep. 29, 1992

[54] APPARATUS FOR MEASURING BENDING MOVEMENTS OF AN ANTENNA SUPPORT MAST, AND APPLICATION THEREOF TO CONTROLLING THE POINTING OF A MOTOR-DRIVEN ANTENNA

[75] Inventor: Alain de Place, Paris, France

[73] Assignee: Alcatel Transmission par Faisceaux Hertziens, France

[21] Appl. No.: 629,956

[22] Filed: Dec. 19, 1990

[30] Foreign Application Priority Data

Dec. 22, 1989 [FR] France ................. 89 17106

[51] Int. Cl.⁵ .................. H01Q 3/00; H01Q 1/12; G01R 7/00
[52] U.S. Cl. .................. 343/766; 343/890; 343/894
[58] Field of Search ........... 343/757, 765, 760, 766, 343/880, 894, 890, DIG. 1; 73/862.04; 33/645, 613, 533, 1 M

[56] References Cited

U.S. PATENT DOCUMENTS 3,938,258 2/1976 Zook ........................ 33/366
4,752,780 6/1988 Pipkin ....................... 343/760

FOREIGN PATENT DOCUMENTS 0106178 4/1984 European Pat. Off. .
0107232 5/1984 European Pat. Off. .
1474751 5/1977 United Kingdom .

Primary Examiner—Michael C. Wimer
Assistant Examiner—Wael Fahmy
Attorney, Agent, or Firm—Sughrue, Mion, Zinn, Macpeak & Seas

[57] ABSTRACT

A device for measuring bending movements of an antenna support mast, wherein the device being comprises: at least two sets of sensors separated by a determined distance d and fixed to the mast in the vicinity of the free end of the mast; and a processor for processing the signals by the sensors; the processor including means for memorizing the signals. The invention is particularly applicable to radio beam links.

5 Claims, 2 Drawing Sheets

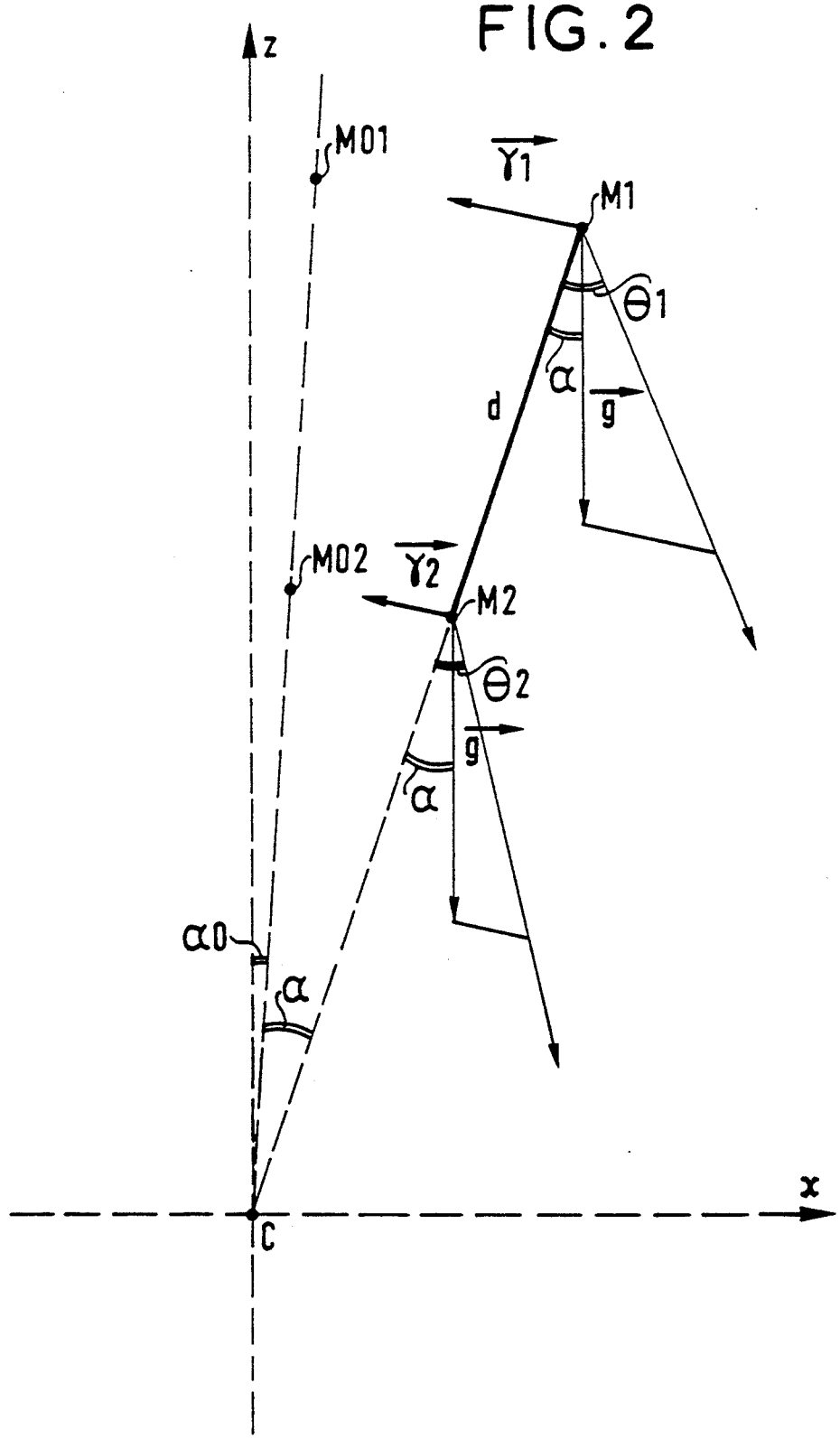

APPARATUS FOR MEASURING BENDING MOVEMENTS OF AN ANTENNA SUPPORT MAST, AND APPLICATION THEREOF TO CONTROLLING THE POINTING OF A MOTOR-DRIVEN ANTENNA

The present invention relates to a device for measuring the bending of an antenna-support mast and to the application thereof to controlling the pointing of a motor-driven antenna.

BACKGROUND OF THE INVENTION

A directional antenna may be mounted on a support such as a mast which suffers unacceptable bending when subjected to dynamic forces that are applied thereto by external fluids, such as the wind.

French patent No. 2 100 522 describes a device for stabilizing the pointing of a directional antenna mounted on a support. This device mainly comprises an antenna support, a power supply device, a transmitter/receiver assembly, and a directional antenna together with a spherically-shaped antenna cover for stabilizing antenna pointing, having the transmitter receiver assembly enclosed therein, and mounted at the top of the antenna support. This disposition cancels all twisting torque as a result of forces due to fluid engaging the outside surface of the cover. However it does not prevent either lateral displacement in the event of forces being applied to one side, thereby giving rise to parallel displacement of the radiated beam in the bearing plane (which has practically no effect on a radiocommunications link), or on elevation displacement in the event of forces being applied in the direction of said link or in the opposite direction, and this type of deflection must be corrected if the link is to be maintained.

Such a spherically-shaped radome protecting a directional antenna centered on the axis of the mast eliminates practically all twisting forces. However it does not compensate for movements due to the mast bending, and that is the object of the present invention.

SUMMARY OF THE INVENTION

To this end, the present invention provides a device for measuring bending movements of an antenna support mast, wherein the device comprises:

at least two sets of sensors separated by a determined distance d and fixed to a support which is in turn fixed to the mast in the vicinity of the free end of the mast; and a processor for processing the signals delivered by the sensors; said processor including means for memorizing said signals.

Advantageously, such a device is capable of memorizing information relating to the movement of the mast. Such a device can therefore be used with any mast since it learns to "know" its mast.

Advantageously, such a device is usable for providing independent servo-control of a motor-driven antenna situated at the top of the mast.

BRIEF DESCRIPTION OF THE DRAWINGS

An embodiment of the invention is described by way of example with reference to the accompanying drawings, in which:

FIG. 2 is a graph for explaining the operation of said device.

DETAILED DESCRIPTION

Figure 1:
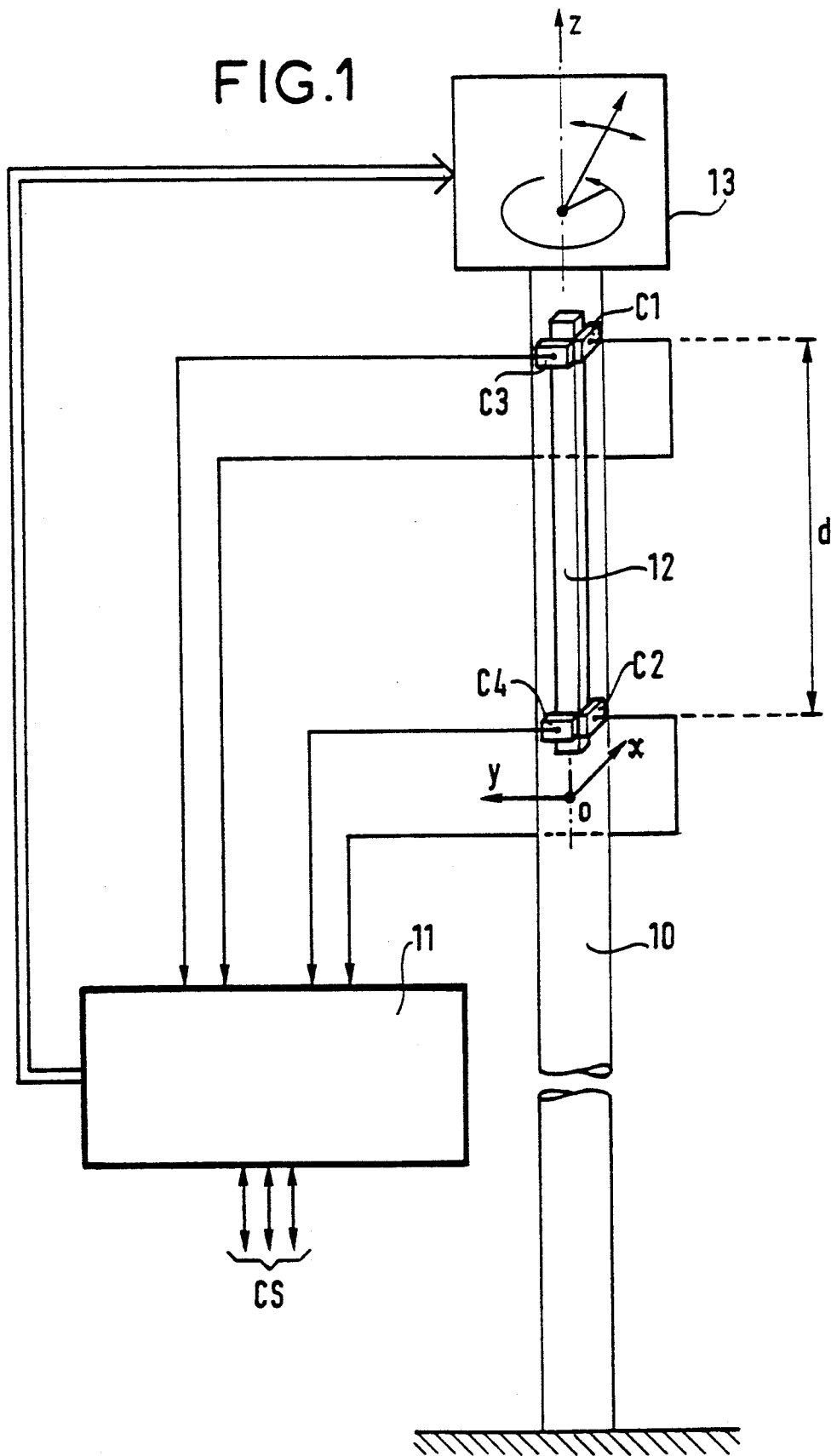
FIG. 1 is a diagram of the device of the invention.

The device of the invention includes at least two sets of sensors $C_i$, $C_{i+1}$, disposed in pairs or triplets, ..., in the vicinity of the free end of the mast 10 which supports a directional antenna 13, which sets of sensors at a distance d apart. The outputs from the sensors are connected to an information processor 11 which includes memory means. The processor 11 receives service commands CS for the device of the invention and it optionally delivers data relating to the pointing of the antenna 13 if the antenna is motor driven, which data is corrected to take account of earlier bending of the mast.

In FIG. 1, two pairs of sensors C1, C2 and C3, C4 are shown. These sensors may be constituted, for example, by clinometers for monitoring the bending of the mast 10 in two mutually perpendicular planes xoz and yoz, thereby providing complete monitoring of the bending.

In FIG. 1, these pairs of clinometers are mounted on a common support 12 which makes it easier to mount them at the top of a mast and ensures that their relative orientations remain stable. The fact that the support 12 is distinct from the mast 10 stiffens the relative positions of the clinometers which are not required, in this disposition, to accommodate the distortion that the bending per se of a length of mast would impart to this length.

By using pairs of clinometers, it is possible to obtain information concerning the orientation of the mast head which is independent of the bending mode of the mast. A single clinometer $C_i$ provides information relating to the direction of the vertical for assemblies that are stationary or that are moving very slowly.

In a dynamic situation, e.g. when a mast head is subjected to the effects of the wind, the readings of a single clinometer $C_i$ are greatly modified by the acceleration of the point $M_i$ where the clinometer is fixed. The observed measurement is then the direction of a difference vector between the acceleration $\gamma$ of the point $M_i$ and the acceleration g due to gravity, and this depends both on the orientation and on the motion of the mast head.

The pseudo-periodic nature of the movements of a mast head nevertheless facilitates forecasting such movements at some instant T, providing these movements have been observed during preceding instants.

Parameters for amplitude, pseudo-period and damping of movement are initially unknown, but they are memorized successively by the processor which can then make use of this data.

Knowledge of the bending mode characteristics of the mast being used, relating the movement of the mast head to its orientation, then makes it possible to distinguish these two parameters and to provide orientation information as required for pointing an antenna.

By using a pair of clinometers in combination, observed measurements are no longer constrained in this way.

It is then no longer necessary to know the bending characteristics of the mast in advance, and this is a great advantage given that such characteristics are specific to each mast, and often to each occasion on which it is used (tension of stays, ...).

The information picked up by each clinometer is digitized and stored by the processor which performs the necessary extrapolations after determining the amplitude, the pseudo-period, and the damping coefficients of the observed movement.

When the antenna 13 situated at the mast head is motor driven, the device of the invention enables its orientation to be controlled so that it maintains a given direction relative to the vertical.

For a better understanding of the operation of the device of the invention, FIG. 2 shows the various movement parameters and the information given by the clinometers operating in the xoz plane, while the simplified calculation given below and suitable for use with small angles explains the principle whereby bending mode characteristics are eliminated.

For a sinusoidal movement of the mast head about a center of gyration C, with a mean position $\alpha O$, such that:

$$\alpha = \alpha 0 + A \sin wt,$$

then:
the position of sensor C1 at point M1 (x1, z1) is:

$$x1 = R1 \sin \alpha$$

$$z1 = R1 \cos \alpha$$

and the position of sensor C2 at point M2 (x2, z2) is:

$$x2 = R2 \sin \alpha$$

$$z2 = R2 \cos \alpha.$$

The measurements obtained from the two clinometers C1 and C2 are the following:

$$\theta 1 = \alpha + \arctan(-\gamma 1x/(g-\gamma 1z))$$

$$\theta 2 = \alpha + \arctan(-\gamma 2x/(g-\gamma 2z))$$

where:
$\gamma 1x, \gamma 1z; \gamma 2x, \gamma 2z$ are components of the acceleration vectors at points M1 and M2;
g is acceleration due to gravity;
$d = R1 - R2$ = distance between M1 and M2;
MO1 and MO2 are the mean positions of M1 and M2.

Movements along the x-axis have an angular frequency w. However movements along the z-axis are small in amplitude for small angles and at an angular frequency of 2w.

The value of $\alpha 0$ is determined by the mean over time of $\theta 1$ or $\theta 2$.

$\gamma 2x$ and $\gamma 2z$ are negligible compared with g.

x1 is approximately $R1\alpha$, giving $\gamma 1x = R1\ A\ w^2 \sin wt$.

Similarly, taking the angle to be equal to its tangent:

$$\theta 1 - \theta 2 = (\gamma 1x - \gamma 2x)/-g$$

$$\theta 1 - \theta 2 = [(R1-R2)A\ w^2 \sin wt]/g = d\ A\ w^2 \sin wt/g.$$

The variable term of $\alpha(A \sin wt)$ is thus directly deduced from $\theta 1 - \theta 2$ once d, g and $w^2$ are known.

w may be measured by observing $\theta 1$ or $\theta 2$ over time.

The value of $\alpha$ used by the device of the invention is obtained by adding together $\alpha 0$ and $A \sin wt$ as determined in this way.

The bending characteristics of the mast under consideration relating the x deflection to the angle $\alpha$ at the mast head are not used, and the device of the invention is thus able to operate with any mast.

Naturally, the present invention is described and shown merely by way of preferred example and its component parts could be replaced by equivalent parts without thereby going beyond the scope of the invention.

The sensors used could be accelerometers.

The simplified calculation given above is merely by way of example.

Similarly, the damped nature of the oscillations of the mast head which describes movement of the form $$\alpha = \alpha 0 + Ae^{-\beta t} \sin wt$$

does not impede evaluation of the angle $\alpha$ since the damping coefficient $\delta$ of the angle $\alpha$ is measured like w by observation over time of $\theta 1$ and $\theta 2$ which are stored by the processor.

I claim:

1. A device for measuring bending movements of an antenna support mast having a longitudinal axis, said device comprising:
   a support fixed to the side of said antenna support mast, in the vicinity of the free end of said mast, and extending in the longitudinal direction of the mast, at least two sets of sensors fixed to said support including a first set of sensors in a first plane, and a second set of sensors in a second plane, said sensors of each set being at a determined, longitudinal distance d from each other, said first and second planes extending parallel to the axis of said mast, the planes being angularly offset around the perimeter of said support and said sets of sensors sensing bending of the mast in said two angularly offset planes; and
   a processor for processing signals delivered by the sensors; said processor including means for memorizing said signals, whereby; said support stiffens the relative positions of the sets of sensors to accommodate distortion due to bending of the portion of mast bearing said support and permits the memorizing means of the processor to successively store the amplitude, pseudo-period and damping movement of the mast.

2. A device according to claim 1, wherein the sensors are clinometers.

3. A device according to claim 1, wherein the sensors are accelerometers.

4. A device as claimed in claim 1 wherein said antenna support mast has a motor driven antenna at a mast head proximate to the free end of the mast, and said device further comprises means for operatively coupling said processor to said motor driven antenna for controlling the position of the antenna in response to bending of the mast in said two angularly offset planes.

5. A device according to claim 1 wherein said two sets of sensors separated by a determined distance d are fixed to said support so as to lie in two mutually perpendicular angularly offset planes XOZ and YOZ.

* * * * *